April 4, 1944.  A. H. BENNETT ET AL  2,346,002
OPTICAL INSTRUMENT, AND PROCESS OF MAKING SAME
Filed Aug. 14, 1940
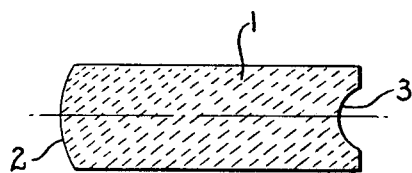
Fig. I
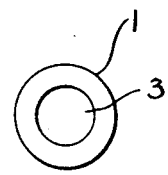
Fig. II
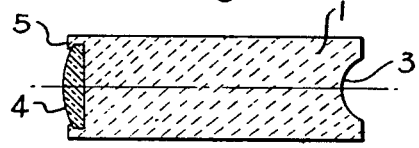
Fig. III
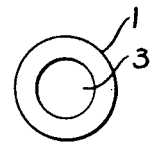
Fig. IV
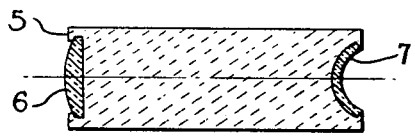
Fig. V
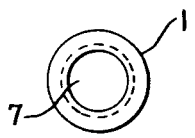
Fig. VI
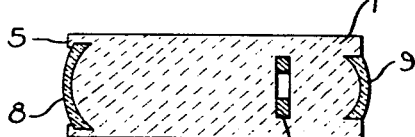
Fig. VII
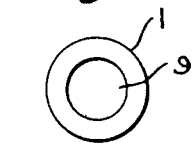
Fig. VIII
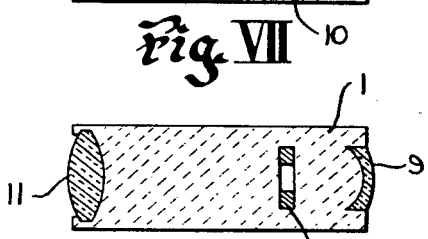
Fig. IX
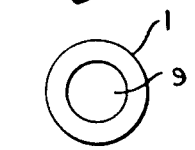
Fig. X
INVENTOR.
ALVA H. BENNETT
ROGER S. ESTEY
BY
Harry H. Styll, ATTORNEY.

Patented Apr. 4, 1944

2,346,002

UNITED STATES PATENT OFFICE 2,346,002

OPTICAL INSTRUMENT AND PROCESS OF MAKING SAME

Alva H. Bennett, Kenmore, and Roger S. Estey, Buffalo, N. Y., assignors to American Optical Company, Southbridge, Mass., a voluntary association of Massachusetts Application August 14, 1940, Serial No. 352,589

5 Claims. (Cl. 88—57)

This invention relates to improvements in instruments having optical lens systems and to improved processes for making the same.

A principal object of the invention is to provide instruments having optical lens systems in which the holding or casing means is also made of a lens medium, and to provide improved processes for making the same.

Another object of the invention is to provide an instrument having an optical lens system wherein the casing or holding means is made of a lens medium wherein some of the lenses of the lens system may be shaped in the said casing or holding means, or wherein separate lens member may be secured in said casing or holding means, or wherein some of said lenses of the lens system may be shaped in the casing or holding means, and other lenses of the lens system may be separate lenses held in said casing or holding means.

Another object of the invention is the provision of simple, efficient and economic means for producing such instruments.

Another object of the invention is to provide means for producing such instruments that will result in a reduction in weight, size and cost of such instruments.

Other objects and advantages of the invention will become apparent from the following description taken in conjunction with the accompanying drawing. It will be apparent that many changes may be made in the arrangement of parts, the details of construction, and the steps of the processes without departing from the invention as set forth in the accompanying claims. It is therefore not desired to limit the invention to the matters shown and described as the preferred forms only have been set forth by way of illustration.

Referring to the drawing:

Fig. I is a longitudinal cross section through a Galilean type of telescope.

Fig. II is an end view of Fig. I.

Fig. III is a longitudinal cross section through a telescope type of instrument with a separate lens inserted.

Fig. IV is an end view of Fig. III.

Fig. V is a longitudinal cross section through a telescope type of instrument having two inserted lenses.

Fig. VI is an end view of Fig. V.

Fig. VII is a longitudinal cross section through a telescope type of instrument having inserted lens and optical elements.

Fig. VIII is an end view of Fig. VII.

Fig. IX is a longitudinal cross section through a telescope type of instrument having inserted lens and optical elements of a different nature, and Fig. X is an end view of Fig. IX Referring to the drawing in which similar characters of reference denote corresponding parts throughout:

Figs. I and II show a Galilean type of telescopic instrument having the body portion 1, the convex lens portion 2, and the concave lens portion 3. The body portion 1 of this instrument is made of an organic transparent plastic resin lens medium. The lens portions 2 and 3 are shaped from the material of the body portion 1 to produce the required lens system. The lens portions 2 and 3 are separated by the distance required to give the desired focus. This instrument may be molded from powdered unpolymerized plastic material and allowed to polymerize under pressure and heat. It may be made from rod stock of plastic material and the portions 2 and 3 molded to shape under heat and pressure, or if desired the surfaces 2 and 3 may be ground and polished to shape. If there is too much light admitted from the sides, the sides may be coated or painted to exclude or cut down the entrance of such light from the sides. The image in this instrument is an upright image.

The instrument shown in Figs. III and IV is similar to the instrument of Figs. I and II, except that the lens 4 is a separate lens of glass or plastic inserted in, and held in the end of the plastic body 1. The lens 4, may be inserted by molding the body 1 around it, or it may be inserted in the end of a rod of plastic and the holding shoulders 5, molded or pressed over the edges of the lens 4 under heat and pressure.

In the instrument shown in Figs. V and VI the two lenses 6 and 7 are both separate lenses inserted in the plastic body 1. This instrument is made in a manner similar to that of the instrument of Figs. III and IV.

In the instrument shown in Figs. VII and VIII, the separate lenses 8 and 9 are inserted in the body 1 as for the instrument of Figs. V and VI. In addition a diaphragm plate 10 is inserted within the body of the plastic member 1. In making this instrument, the diaphragm may be molded in when the body 1 is molded. The lenses 8 and 9, may be molded in at the same time or they may be inserted in the ends thereafter under pressure and heat.

The instrument of Figs. IX and X is made in a manner similar to that of Figs. VII and VIII.

The lens 11 is of different optical character from lens 8.

Plastic resin is much lighter than glass lens material, its light transmission is better than that of glass and it is not as frangible as glass. It may be molded to good optical surfaces.

With instruments of this character it is not necessary to have the usual tubing or casings for holders. The instrument as a consequence is lighter and smaller and it is decidedly less costly to make because there is no tooling or machining required for metal parts. The instruments are compact, light and inexpensive as compared with prior instruments of this character.

From the foregoing it will be seen that simple, efficient and economical means have been provided to obtain all the objects and advantages of the invention.

Having described the invention it is claimed as follows:

1. An optical instrument having spaced lens elements to produce an optical system, said lens elements having edge and side surfaces and being of a material having a given index of refraction, and a single long and slender bar-like body portion of a moldable plastic material having a different index of refraction and a diameter greater than said lens elements moldably uniting the spaced elements of the optical system, at least one side surface of each of said elements being in substantially intimate engagement with the plastic material throughout substantially the entire surface engaging the moldable material with said material having a portion surrounding and overlying a major portion of the edge surfaces of said spaced lens elements.

2. An optical instrument having spaced lens elements to produce an optical system, said lens elements having edge and side surfaces and being of a material having a given index of refraction, and a single long and slender bar-like body portion of a moldable plastic material having a different index of refraction and a diameter greater than said lens elements moldably uniting the spaced elements of the optical system, at least one side surface of each of said elements being in substantially intimate engagement with the plastic material throughout substantially the entire surface engaging the moldable material with said material having a portion surrounding and overlying a major portion of the edge surfaces of said spaced lens elements and extending inwardly of the edge surfaces on the exposed side of said lens elements to mechanically lock the lens elements in position.

3. An optical instrument having spaced lens elements and a diaphragm to produce an optical system, said lens elements having edge and side surfaces and being of a material having a given index of refraction, and a single body portion of a moldable plastic material having a different index of refraction from said lens elements moldably uniting the spaced elements of the optical system, at least one side surface of each of said elements being in substantially intimate engagement with the plastic material throughout substantially the entire side surface engaging the moldable material with said material having a portion surrounding and overlying a major portion of the edge surfaces of said spaced lens elements with the diaphragm being substantially embedded within the plastic material.

4. An optical instrument having spaced lens elements to produce an optical system, said lens elements having edge and side surfaces and being of a material having a given index of refraction, and a single long and slender bar-like body portion of a moldable plastic material having a different index of refraction and a diameter greater than said lens elements moldably uniting the spaced elements of the optical system, at least one side surface of each of said elements being in substantially intimate engagement with the plastic material throughout substantially the entire side surface engaging the moldable material with said material having a portion surrounding and overlying a major portion of the edge surface only of one of said spaced lens elements, and overlying a major portion of the edge surface and extending inwardly of the edge surface on the exposed side of the other of said lens elements to mechanically lock both of said lens elements in position by a flange-like disposition of the plastic material.

5. An optical instrument having spaced lens elements to produce an optical system, said lens elements having edge and side surfaces and a single long and slender bar-like body portion of a moldable plastic material having a diameter greater than and moldably uniting the spaced elements of the optical system, at least one side surface of each of said elements being in substantially intimate engagement with the plastic material throughout substantially the entire side surface engaging the moldable material with said material having a portion overlying a major portion of the edge surfaces of said spaced lens elements.

ALVA H. BENNETT.
ROGER S. ESTEY.